(12) United States Patent
Schroth et al.

(10) Patent No.: US 8,453,393 B2
(45) Date of Patent: Jun. 4, 2013

(54) ENCAPSULATED AND VENTED PARTICULATE THERMAL INSULATION

(75) Inventors: Alberto E. Schroth, El Segundo, CA (US); Jimmy L. Clark, Newhall, CA (US); Michael Doan, El Monte, CA (US); David M. La Komski, Long Beach, CA (US); Shannon O. White, Hudson, MA (US); Stephen E. Smith, Somerville, MA (US); Christopher M. Shaffer, Groton, MA (US); Wilfried Krone-Schmidt, Fullerton, CA (US)

(73) Assignees: Raytheon Company, Waltham, MA (US); Aspen Aerogels, Inc., Northborough, MA (US)

( * ) Notice: Subject to any disclaimer, the term of this patent is extended or adjusted under 35 U.S.C. 154(b) by 1640 days.

(21) Appl. No.: 11/511,060

(22) Filed: Aug. 25, 2006

(65) Prior Publication Data

US 2008/0057334 A1  Mar. 6, 2008

(51) Int. Cl.
 *E06B 7/12* (2006.01)
 *B32B 1/04* (2006.01)
 *B32B 3/02* (2006.01)

(52) U.S. Cl.
 USPC .............................................. 52/172; 428/74

(58) Field of Classification Search
 USPC ............... 428/74, 75, 76; 52/794.1, 172
 See application file for complete search history.

(56) References Cited

U.S. PATENT DOCUMENTS

| | | | | |
|---|---|---|---|---|
| 3,756,895 A * | 9/1973 | Bellamy | ....................... | 156/257 |
| 3,854,912 A * | 12/1974 | Terrel et al. | ..................... | 96/134 |
| 3,928,953 A * | 12/1975 | Mazzoni et al. | ................. | 52/172 |
| 4,037,751 A * | 7/1977 | Miller et al. | ................... | 428/593 |
| 4,259,028 A * | 3/1981 | Cook | .............................. | 405/282 |
| 4,523,577 A * | 6/1985 | McClelland | ................... | 126/633 |
| 4,567,080 A * | 1/1986 | Korsgaard | ...................... | 428/137 |
| 4,618,532 A * | 10/1986 | Volland et al. | ............. | 428/304.4 |
| 4,636,415 A | 1/1987 | Barito et al. | | |
| 4,676,946 A * | 6/1987 | Feinzig et al. | ................. | 376/289 |
| 4,712,347 A * | 12/1987 | Sperber | ........................ | 52/404.1 |
| 4,777,086 A | 10/1988 | Madden et al. | | |
| 4,849,277 A * | 7/1989 | Jaklofsky | ....................... | 428/139 |
| 4,852,314 A * | 8/1989 | Moore, Jr. | ........................ | 52/199 |
| 5,023,124 A * | 6/1991 | Kobayashi | ....................... | 428/76 |
| 5,082,335 A | 1/1992 | Cur et al. | | |
| 5,160,769 A | 11/1992 | Garrett | | |
| 5,168,674 A * | 12/1992 | Molthen | ........................ | 52/2.16 |
| 5,246,759 A | 9/1993 | Keller | | |
| 5,271,980 A | 12/1993 | Bell | | |
| 5,287,674 A * | 2/1994 | Sperber | ........................ | 52/742.13 |
| 5,365,716 A * | 11/1994 | Munson | ........................ | 52/742.13 |
| 5,417,789 A | 5/1995 | Lauritzen | | |
| 5,433,050 A * | 7/1995 | Wilson et al. | ................. | 52/302.1 |
| 5,440,898 A * | 8/1995 | Starr | ................................ | 62/474 |
| 5,716,521 A * | 2/1998 | Whiteley et al. | ............... | 210/266 |
| 6,037,033 A * | 3/2000 | Hunter | ............................ | 428/72 |
| 6,068,882 A | 5/2000 | Ryu | | |

(Continued)

*Primary Examiner* — Andrew Triggs

(74) *Attorney, Agent, or Firm* — Thorpe North & Western LLP

(57) ABSTRACT

An article includes a piece of encapsulated insulation including an envelope having at least two vents therethrough, a particulate insulation within the envelope, and a porous filter overlying each vent of the envelope. The porous filter has a mesh size no larger that the minimum size of the particles. The article may further include a structure having a structure surface, and the piece of encapsulated insulation overlies and covers at least a portion of the structure surface.

4 Claims, 5 Drawing Sheets

U.S. PATENT DOCUMENTS

| | | | |
|---|---|---|---|
| 6,096,416 A * | 8/2000 | Altenberg | 428/317.7 |
| 6,132,837 A | 10/2000 | Boes et al. | |
| 6,187,696 B1 * | 2/2001 | Lim et al. | 442/77 |
| 6,221,456 B1 | 4/2001 | Pogorski et al. | |
| 6,403,195 B1 * | 6/2002 | Montagna et al. | 428/71 |
| 6,579,586 B1 * | 6/2003 | Fay et al. | 428/40.1 |
| 6,584,749 B2 * | 7/2003 | Sperber | 52/742.1 |
| 6,586,006 B2 | 7/2003 | Roser et al. | |
| 6,770,350 B2 * | 8/2004 | Arndt et al. | 428/76 |
| 6,858,280 B2 | 2/2005 | Allen et al. | |
| 6,967,051 B1 | 11/2005 | Augustynowicz et al. | |
| 6,989,123 B2 | 1/2006 | Lee et al. | |
| 6,991,842 B2 * | 1/2006 | Hurwitz | 428/71 |
| 7,078,359 B2 | 7/2006 | Stepanian et al. | |
| 7,095,584 B2 * | 8/2006 | Logan | 360/97.02 |
| 7,201,959 B2 * | 4/2007 | Judek et al. | 428/323 |
| 7,266,930 B1 * | 9/2007 | Fisher | 52/306 |
| 2001/0032436 A1 * | 10/2001 | Riegelman | 52/786.13 |
| 2002/0094426 A1 | 7/2002 | Stepanian et al. | |
| 2002/0102674 A1 | 8/2002 | Anderson | |
| 2002/0157702 A1 * | 10/2002 | Cordaro | 136/256 |
| 2003/0215612 A1 * | 11/2003 | Richards, Jr. | 428/174 |
| 2004/0074208 A1 * | 4/2004 | Olson et al. | 52/794.1 |
| 2004/0121111 A1 * | 6/2004 | Hurwitz | 428/76 |
| 2005/0005545 A1 * | 1/2005 | Jerry | 52/204.5 |
| 2005/0167891 A1 | 8/2005 | Lee et al. | |
| 2005/0238803 A1 * | 10/2005 | Tremel et al. | 427/180 |
| 2005/0255139 A1 * | 11/2005 | Hurd et al. | 424/405 |
| 2006/0035054 A1 | 2/2006 | Stepanian et al. | |
| 2006/0162566 A1 * | 7/2006 | Kondo | 96/146 |
| 2006/0230707 A1 * | 10/2006 | Roe et al. | 52/794.1 |
| 2007/0015948 A1 * | 1/2007 | Cadieux et al. | 588/252 |
| 2007/0224390 A1 * | 9/2007 | McCormick | 428/137 |
| 2008/0057334 A1 * | 3/2008 | Schroth et al. | 428/615 |

\* cited by examiner

ENCAPSULATED AND VENTED PARTICULATE THERMAL INSULATION

RIGHTS OF THE GOVERNMENT

This invention was made with Government support under Contract No. FA9453-04-C-0311 awarded by the U.S. Air Force. The Government has certain rights in the invention.

This invention relates to a thermal insulation material and its use and, more particularly, to the structure and use of a fiber-reinforced aerogel composite that is encapsulated and vented through porous filters that prevent the loss of particulate material to the environment.

BACKGROUND OF THE INVENTION

Temperature control is an important consideration in many spacecraft applications. In one spacecraft application, structures must be protected against temperature extremes of heat or cold that could cause the structure to warp or otherwise become damaged. Even slight temperature-induced deformation may cause a sensitive structure to become inoperable.

In another spacecraft application, some devices must be maintained at extremely low operating temperatures. For example, many electronic components that process infrared signals are operated at cryogenic temperatures (e.g., 77K or less) to avoid spurious heat-related signals or because the instrumentation functions properly only at such low temperatures. At higher temperatures, the devices may become inefficient or cease operation entirely.

Such devices requiring low temperature are usually provided with their own cooling capability such as a closed-cycle refrigerator or cryostat. The more heat that the refrigerator must remove, the larger it is and the more power it consumes. Additionally, the more heat leakage, the slower the initial cool-down of the cooled device, and the greater the cooling capacity required to maintain the cooled device at the operating temperature.

For these reasons, the temperature-sensitive structures and cooled devices are carefully insulated as well as internally cooled. The state-of-the-art insulation for cooled devices operating in space is "multi-layer insulation", sometimes termed MLI. Typically, the MLI is formed of alternating layers of polymeric radiation shield and low-thermal-conductivity material such as a polymeric mesh. The radiation shield reflects radiated heat, and the low-thermal-conductivity material separates the layers of radiation shield and also prevents conductive thermal transport through the MLI. In most applications, the MLI includes 15-70 or more layers. To insulate the device, the layers are individually applied by hand layup in a serial manner, and the layers are joined together appropriately. This application is a slow, costly process.

The MLI may be effective in insulating the device, but it is extremely difficult and time-consuming to apply correctly. Regardless of the care and skill of the technicians who apply the MLI, a wide variation in the final insulation performance is measured from insulated device to insulated device. As a result, even after careful application precisely following the established best assembly practices, the measured thermal performance of the insulated device may be insufficient for the required application. At that point, it is necessary either to add more insulation or to remove the applied insulation and redo the insulation, and even after reworking the insulation the performance may be inadequate. Additionally, thermal shorts that provide local high-heat-flow paths are often observed in insulated hardware, particularly at sharp corners but potentially anywhere, in the normally handled device. The thermal shorts may appear in an insulated device that initially has proper performance, but later develops the heat-leakage problem as a result of routine handling. Thermal shorts also may result from dropping or impacting the insulated hardware. The insulating of hardware using MLI is time consuming and expensive, and even then achieves somewhat unpredictable results.

There is a need for an improved approach to insulating space-operated hardware that achieves a level of insulation performance equivalent to or better than that of current MLI, but at reduced cost and with greater predictability and reliability. The present invention fulfills this need, and further provides related advantages.

SUMMARY OF THE INVENTION

The present approach provides an insulation material article, a method for preparing the insulation material article, an insulated structure, and a method for preparing the insulated structure. This approach provides thermal insulation generally of the same performance level as the best insulation performance achieved with MLI in space applications, with much less variability than that observed for MLI. That is, the insulation performance of the present material is consistently good and comparable with the best performance achieved with MLI, and also is more robust (that is, less sensitive to handling) than MLI. The present material maintains its thermal insulating performance over a range of routine and non-routine handling conditions that would cause significant degradation to the insulating properties of MLI. The better predictability of the present insulation material in space applications allows thermal performance to be more easily modeled, and permits a better design of the refrigerator when one is used because the behavior of the insulation is less variable. The present insulation material is more easily and economically applied than is MLI, seldom requires rework, and permits much easier rework if necessary. The present insulation material also is more readily applied at corners and other irregularities than is MLI. Thermal shorting at corners and other locations is largely avoided. The insulation material is also compatible with space applications, as all of the components may be made of space-compatible materials.

In accordance with the invention, an article comprises a piece of encapsulated insulation comprising an envelope having at least two vents therethrough, and a particulate insulation within the envelope. The insulation comprises a plurality of particles having a minimum size. A porous filter overlies each vent of the envelope. The porous filter has a mesh size sufficiently small to prevent the escape of the insulation particles from the interior of the envelope. In most cases, the porous filter has a mesh size no larger that the minimum size of the particles.

Preferably, the envelope is made of a sheet of a polymeric material such as polyethylene terepthalate (polyester), sold as Mylar® polymer. The polymeric sheet may be metallized (i.e., coated on at least one side with a thin metallic layer such as aluminum), or not metallized. The sheet of polymeric material preferably has a thickness of not more than about 0.002 inch, more preferably has a thickness of not more than about 0.001 inch, and most preferably has a thickness of from about 0.00025 to about 0.001 inch. For many applications, the envelope has a blanket shape with two substantially equal opposing faces that are separated by a distance that is much less than the in-plane dimensions of the opposing faces. The opposing faces are typically separated by a distance of from about 0.080 to about 0.75 inches, most preferably about 0.25 inches, thereby defining the thickness of the envelope and the thickness of the encapsulated insulation.

The insulation particles are preferably aerogel particles. Examples of operable forms of the aerogel particles include granules, beads, panels formed of the particles, and net-shape fiber-reinforced particulate composites. In one preferred form, the particulate insulation comprises a fiber-reinforced particulate composite, most preferably a fiber-reinforced aerogel composite.

Each vent preferably has an open area of at least about 0.05 square inches, equivalent to a circular diameter of about 0.25 inches, to achieve sufficient release of otherwise-entrapped gas from the interior of the envelope. There must be a porous filter over and completely covering each of the vents. Each porous filter has a mesh size sufficient to prevent passage of the interior particles through the porous filter. In a typical case, the porous filter has a mesh size sufficient to prevent passage of 0.5 micrometer diameter particles through the porous filter. These filter-covered vents are preferably placed in the encapsulating polymer at intervals of not more than about 4 inches over the entire blanket area.

The article may further include a structure having a structure surface, wherein the piece of encapsulated insulation overlies and covers at least a portion of the structure surface. There may be at least two layers of insulation that overlie and cover at least a portion of the structure surface, wherein at least one of the layers of insulation is the piece of encapsulated insulation. Where a layer of the encapsulated insulation has a seam, it is preferred that seams in the overlying layers of encapsulated insulation do not provide a straight thermal path through the layers of encapsulated insulation.

In a related embodiment, the particulate insulation is a continuous aerogel insulation. In this embodiment, an article comprises a piece of encapsulated insulation comprising an envelope having at least two vents therethrough, a continuous monolithic aerogel insulation within the envelope, and a porous filter overlying each vent of the envelope. The porous filter has a mesh size no larger than a minimum particulate size that may be shed from the continuous aerogel insulation. The continuous aerogel insulation may have a particulate nature at a submicroscopic level, and particles may shed (i.e., break off) from the continuous aerogel insulation mass. Other compatible features discussed herein may be used with this embodiment.

The present material replaces MLI in space applications. The vented-envelope construction allows gases within the encapsulated insulation to escape during launch, and when exposed to the vacuum of space leaves the encapsulated insulation with an interior vacuum that prevents conductive heat loss. The particulate insulation prevents the envelope from collapsing in thickness during installation and service, avoiding thermal shorts. The particulate insulation, particularly the fiber-reinforced aerogel insulation, and the thin envelope material are sufficiently flexible to allow the encapsulated insulation to be wrapped around some structures and their corners. In other cases, the structure is covered by layup of individual flat pieces of the encapsulated insulation. The porous filters placed over the vents prevent the loss of particles and/or other solid matter, such as material shed from the mass of particles, to escape from the insulation and potentially foul delicate apparatus, or deposit on mirror or lens surfaces, in the weightless space environment. The insulation material may be constructed entirely of space-rated materials.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
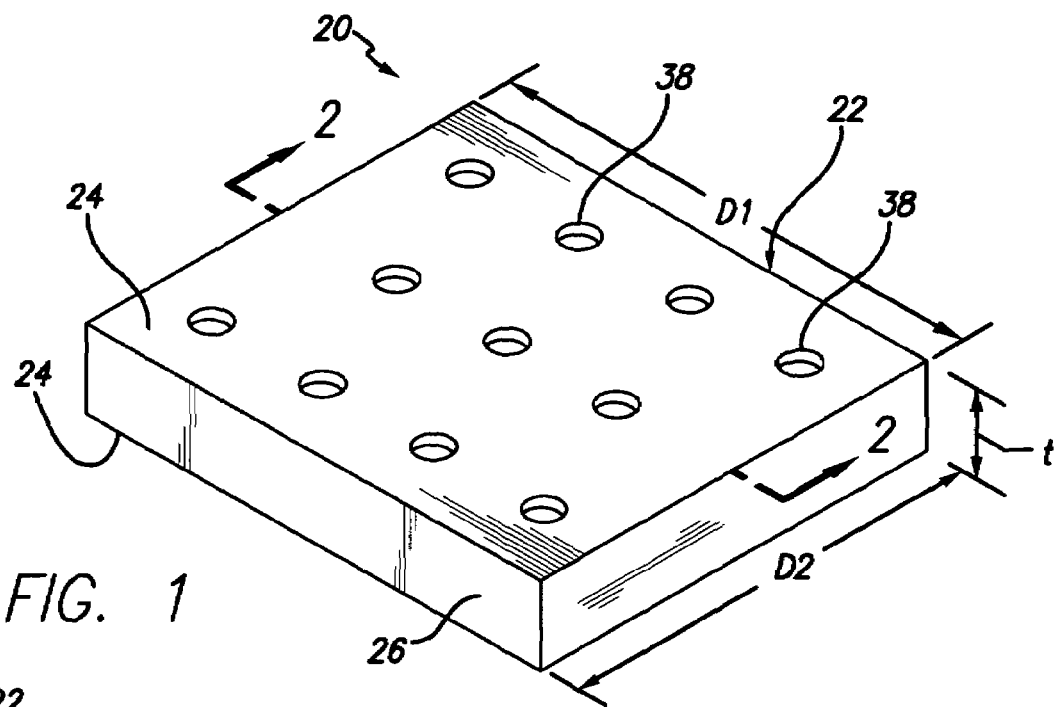
FIG. 1 is a perspective view of an article including an embodiment of a piece of encapsulated insulation.

FIG. 1 depicts in perspective view an article 20 that includes a piece of encapsulated insulation 22. The piece of encapsulated insulation 22 preferably, but not necessarily, has a blanket shape with two substantially equal opposing faces 24, and an edge 26 separating the opposing faces 24. A surface area of the edge 26 is smaller than a surface area of either of the opposing faces. The edge separates the opposing faces 24 by a distance of from 0.08 to 0.75 inches, most preferably 0.25 inches, which defines the thickness of the blanket-shaped piece of encapsulated insulation 22. Typically, in such a blanket the transverse dimensions D1 and D2 of the faces 24 are much larger than the separation dimension or thickness t (i.e., at least 10 times, sometimes at least 20 times, and often 50 or more times larger than t) of the piece of encapsulated insulation 22. In another but substantially equivalent form of the piece of encapsulated insulation 22, the periphery of the opposing faces 24 may be brought together and sealed so that there is no identifiable edge, but D1 and D2 are still much larger than t, and often when the piece of encapsulated insulation 22 is in blanket form. In yet another but substantially equivalent form of the piece of encapsulated insulation 22, the envelope that defines the shape of the piece of encapsulated insulation may be wound as a continuous piece of material, but again D1 and D2 are still much larger than t when the piece of encapsulated insulation 22 is in blanket form. Thus, regardless of the mode of construction, D1 and D2 are much larger than t when the piece of encapsulated insulation 22 is in blanket form.

Figure 2:
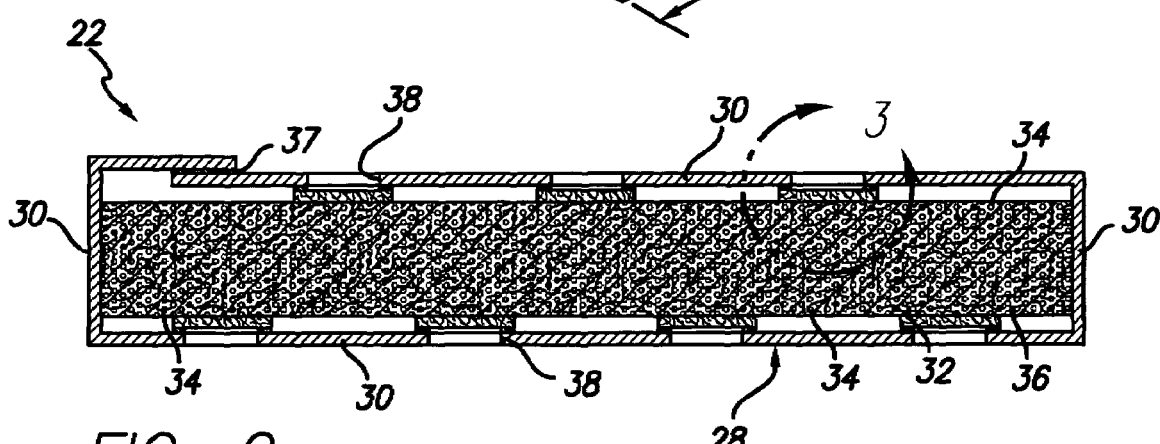
FIG. 2 is a sectional view of the piece of encapsulated insulation of FIG. 1, taken on lines 2-2.
Figure 3:
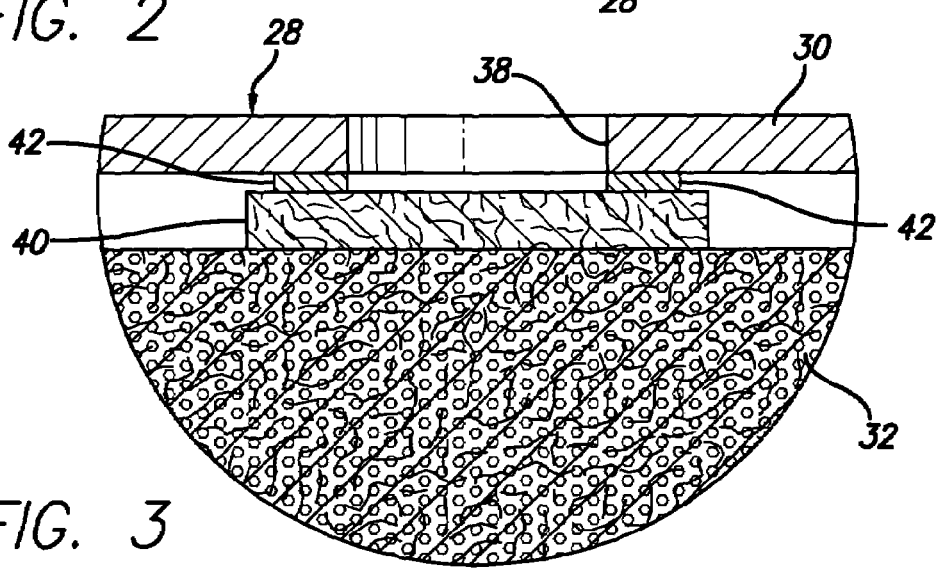
FIG. 3 is a detail of FIG. 2, illustrating the installation of the porous filter.

The construction of the piece of encapsulated insulation 22 is illustrated in FIGS. 2-3. As shown in the sectional view of FIG. 2, the piece of encapsulated insulation 22 includes an envelope 28. The envelope 28 is preferably made of a thin sheet 30 of a polymeric material such as polyethylene terepthalate (polyester), available as Mylar® sheet, which is a space-qualified material. Some examples of other operable materials from which the thin sheet 30 of the envelope 28 may be constructed include clear or metallized polyester film, plastic film, and other types of polymeric films.

The thin sheet 30 of polymeric material preferably has a thickness of not more than 0.002 inch, more preferably has a thickness of not more than 0.001 inch, and most preferably has a thickness of from 0.00025 to 0.001 inch. The thin sheet 30 may optionally be coated with a thin layer of a metallization such as aluminum, which is typically on the order of about 1000 Angstroms thick. The thin metallization reflects heat.

The envelope 28 encloses a particulate insulation 32. The particulate insulation 32 comprises a plurality of particles 34 having a minimum size. The particles 34 are preferably aerogel particles, and most preferably are aerogel particles made of a material such as inorganic, organic, or hybrid aerogels such as organically modified silica. The aerogel particles 34 desirably are generally equiaxed, with a minimum size of about 0.5 micrometers. Other materials and particle sizes are operable. Non-aerogel insulating particles are also operable. The particulate insulation may be a continuous monolithic aerogel insulation, which may have a particulate character at a very fine, sub-microscopic level. Fine particles of the continuous aerogel insulation having a minimum particulate size may break off during service, but the present approach contains any such shed particulate material.

The particulate insulation 32 is most preferably a fiber-reinforced aerogel composite material. In such a composite material, the aerogel particles form a matrix, and discontinuous fibers 36 are embedded in the aerogel-particulate matrix. The composition, structure, and preparation of such a fiber-reinforced aerogel composite material are discussed in U.S. Pat. No. 7,078,359, whose disclosure is incorporated by reference. The thermal properties of the fiber-reinforced aerogel composite material are dominated by the thermally insulating character of the aerogel particles 34. The fibers 36 hold the particles 34 together into a coherent mass that may be bent to shape to conform to surfaces, and may readily be encapsulated as discussed subsequently.

During assembly, the thin sheet 30 of the envelope material may be wrapped around the particulate insulation 32 and an overlapping end taped using double-sided adhesive tape 37, as seen in FIG. 2. Other joints in the envelope may be similarly closed. The taping of the joints is not expected to provide a hermetic seal at the joints, but it is sufficient to prevent particles 34 and shed particles from passing through the joints.

There are at least two vents 38, and typically many more vents 38, through the faces 24 of the envelope 28, to allow gas communication between the particulate insulation 32 and the exterior of the piece of encapsulated insulation 22. Thus, the vents 38 allow gas to escape from the interior of the envelope 28 and prevent the envelope 28 from ballooning due to internal pressure when the piece of encapsulated insulation 22 is taken to a low-pressure space environment for service. The vents 38 are present on both opposing faces 24 of the envelope. Each vent 38 preferably has an opening area of at least 0.05 square inches, to permit outgassing of the interior of the envelope 28 in service. In a preferred design, the vents are circular of a diameter of ¼ inch and are spaced about 4 inches apart, but the invention is not limited to these values. The taped joints prevent gas from flowing through the joints, and causes the gas to flow through the vents 38.

Referring to FIG. 3, a porous filter 40 overlies each vent 38 of the envelope 28. The porous filter 40 prevents the escape of particles 34 that are loose or may be shed from the particulate insulation 32 from escaping through the vents 38. The porous filter 40 has a mesh size no larger that the minimum size of the particles. In the presently preferred embodiment, each porous filter 40 has a mesh size sufficient to prevent passage of 0.5 micrometer aerogel particles through the porous filter 40, and therefore the pore size of the porous filter 40 is slightly smaller than 0.5 micrometers. The porous filter 40 may be joined to the thin sheet 30 of the envelope 28 using pieces of double-sided adhesive tape 42.

It is critical that there must be a porous filter 40 overlying and covering each and every vent 38 for the present approach to be operable. If any vent 38 is unfiltered, any loose particles 34 and/or loose pieces that break off (i.e., shed) from the particles 34 or the fibers 36 (where used) may escape from the interior of the envelope 28 into the environment outside of the piece of encapsulated insulation 22. In the zero-gravity space environment, such escaped material does not settle but floats. The escaped material may find its way into delicate machinery or circuitry, or onto the surfaces of mirrors or lenses, and interfere with their operation.

In the preferred embodiment wherein the size of the particles 34 is about 0.5 micrometers, the selected porous filter 40 is a Millipore Category FHLP02500 filter. This porous filter 40 has 0.45 micrometer diameter pores over a 25 millimeter diameter total filter area. The preferred size of the vents 38 is about ¼ inch, and therefore the selected porous filter 40 completely covers the vent 38 over which it is applied.

Figure 4:
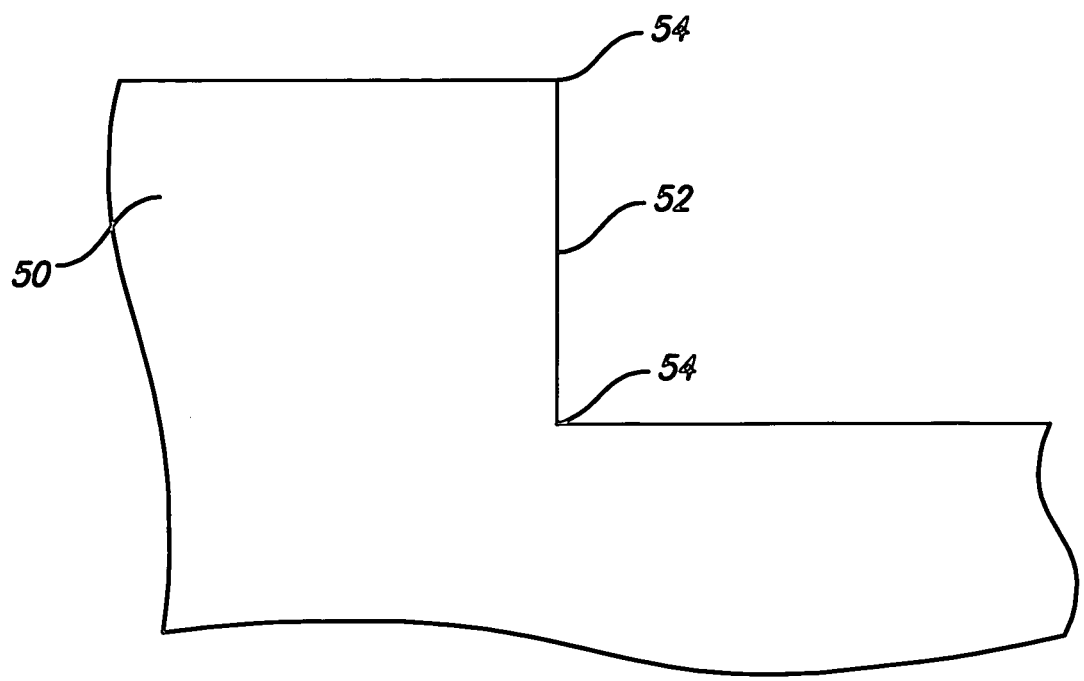
FIG. 4 is an elevational view of a portion of an article that is to be insulated.

The article 20 may also include a structure 50 having a structure surface 52, as shown in FIG. 4. A typical structure surface 52 includes at least one corner 54. At least one piece of the encapsulated insulation 22 overlies and covers at least a portion of the structure surface 52.

Figure 5:
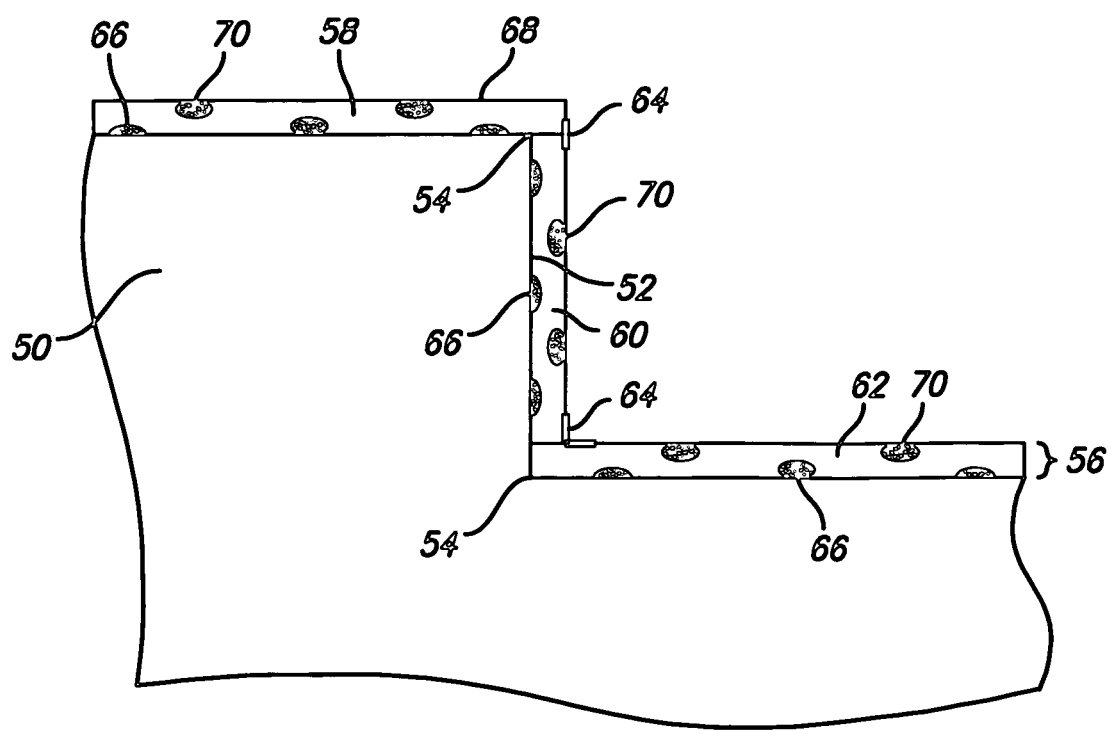
FIG. 5 is an elevational view of the portion of the article of FIG. 4, with a first layer of encapsulated insulation thereon.

FIG. 5 shows the structure 50 with one layer 56 of the encapsulated insulation 22 overlying and contacting the structure surface 52. The layer 56 is formed of three segmented pieces 58, 60, and 62 of the encapsulated insulation 22, with the pieces pairwise butted end-to-end to form the layer 56. That is, pieces 58 and 60 are butted end-to-end, and pieces 60 and 62 are butted end-to-end. In this case, the pieces 58, 60, and 62 are dimensioned so that the pieces are butted end-to-end at the corners 54. In this case, the encapsulated insulation 22 does not have to bend around the corners 54. The pieces 58, 60, and 62 are joined to each other with pieces of tape 64. The pieces 58, 60, and 62 are joined to the structure surface 52 by small amounts of adhesive, termed "adhesive dots" 66. Additional adhesive dots 70 are optionally provided on the free surface 68 of the layer 56 for the application of an additional overlaying layer (as will be discussed in relation to FIG. 6). If no additional overlying layer is to be applied, no additional adhesive dots 70 are required.

Figure 6:
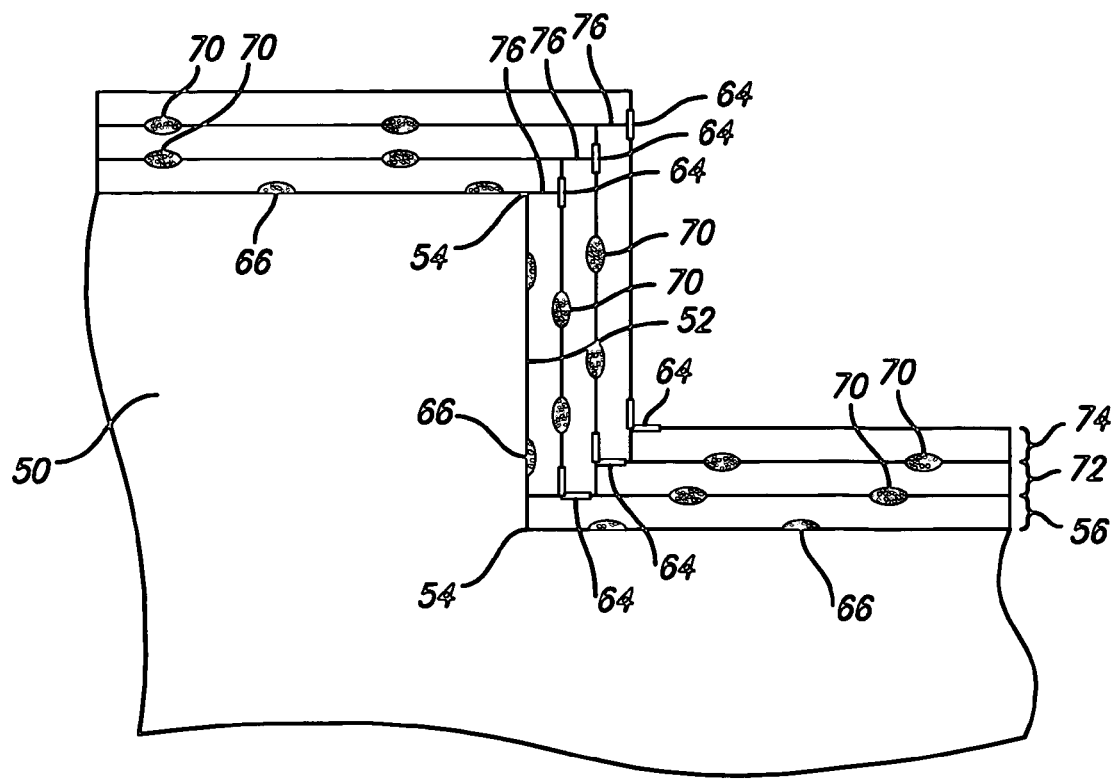
FIG. 6 is an elevational view of the portion of the article of FIG. 4, with three layers of encapsulated insulation thereon.

In the embodiment of FIG. 6, two additional layers 72 and 74 are added to the layer 56 to overlie the structure surface 52. Elements common with other embodiments are assigned the same reference numerals, and the prior description is incorporated. The same segmented approach is used in layers 72 and 74 as in layer 56, with the ends of the segmented pieces butted together and taped in place with tape 64. Adhesive dots 66 and 70 hold the layer 56 to the structure surface 52 and the layers 56/72 and 72/74 together. Care is taken at the corners 54 where the segmented pieces are joined together that the butt joints 76 do not line up and do not provide a straight line-of-sight thermal path through the layers 56, 72, and 74 of the encapsulated insulation 22, which would thereby provide a direct line-of-sight thermal leak path to the structure 50. This non-line-of-sight positioning of the butt joints 76 is termed a "tortuous path". In the illustrated embodiment of FIG. 6, all of the layers 56, 72, and 74 are made of the encapsulated insulation 22. However, that need not be the case, and one or two of the layers 56, 72, and 74 could be conventional insulation or a sheet of material of the envelope 28.

Figure 7:
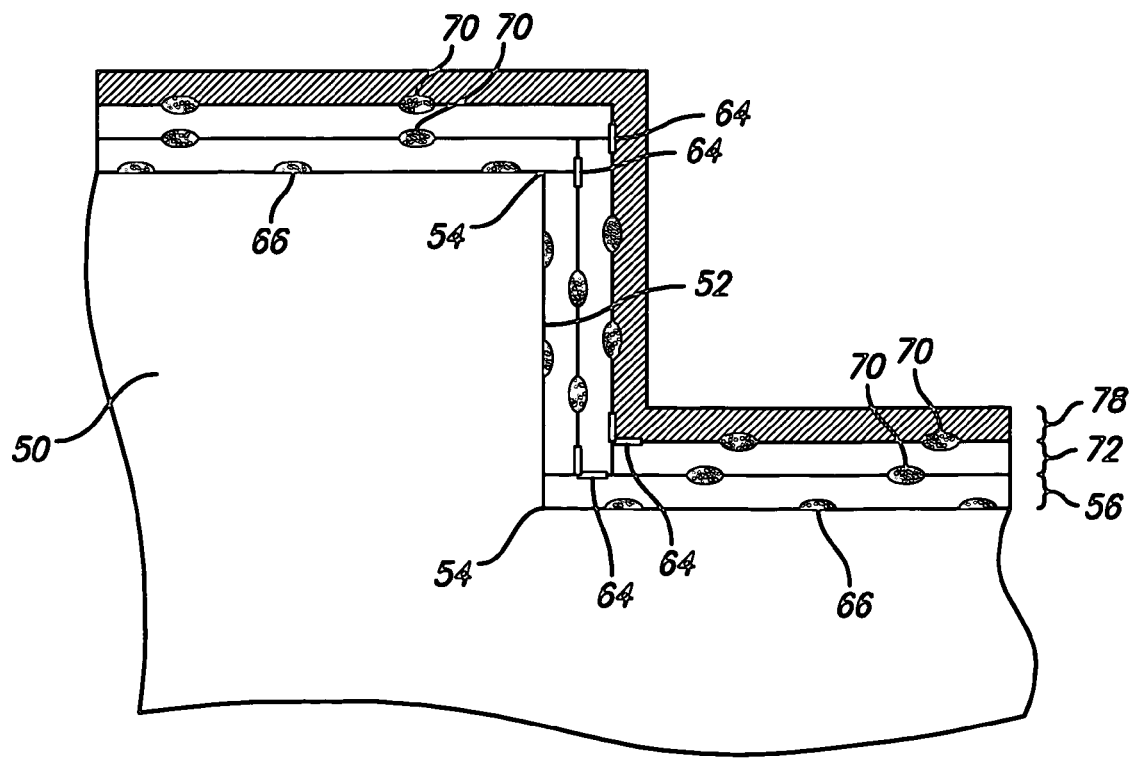
FIG. 7 is an elevational view of the portion of the article of FIG. 4, with two layers of encapsulated insulation and a continuous top layer thereon.

FIG. 7 illustrates an embodiment wherein the same layers 56 and 72 are provided. Elements common with other embodiments are assigned the same reference numerals, and the prior description is incorporated. In the embodiment of FIG. 7, a continuous layer 78 is applied, in this case overlying the layer 72 as a top layer. The continuous layer 78 consists of a single layer of either the encapsulated insulation 22 or a different material such as the same material as is used to form the thin sheet 30 of the envelope 28 or a different material such as a different type of insulation. The encapsulated insulation 22 is generally sufficiently flexible to be wrapped around corners 54. The continuous layer 78 is adhered to the layer 72 with adhesive dots.

The present approach has been reduced to practice and comparatively tested against multilayer insulation (MLI). A piece of space-rated, full-size hardware, an ACES infrared test telescope, was obtained for use in this study. The ACES telescope has an irregular surface structure with numerous features such as illustrated in FIGS. 4-7. The use of the ACES infrared telescope as a test substrate for the insulation testing provides realistic comparisons of the two insulation types.

A 30-layer MLI insulation, on the order of about 0.75 inches in total thickness, was applied over the ACES telescope using best assembly practices. The ACES telescope with MLI was fully instrumented and thermally tested in a vacuum chamber over a range of conditions. The MLI insulation was removed. The ACES telescope was next insulated using best assembly practices with three 0.25 inch-thick blankets of the encapsulated and vented particulate thermal insulation, on the order of about 0.75 inches in total thickness. The ACES telescope with the encapsulated and vented particulate thermal insulation was fully instrumented and thermally tested in a vacuum chamber over a range of conditions, in a manner identical with the prior testing of the ACES telescope with MLI insulation.

Figure 8:
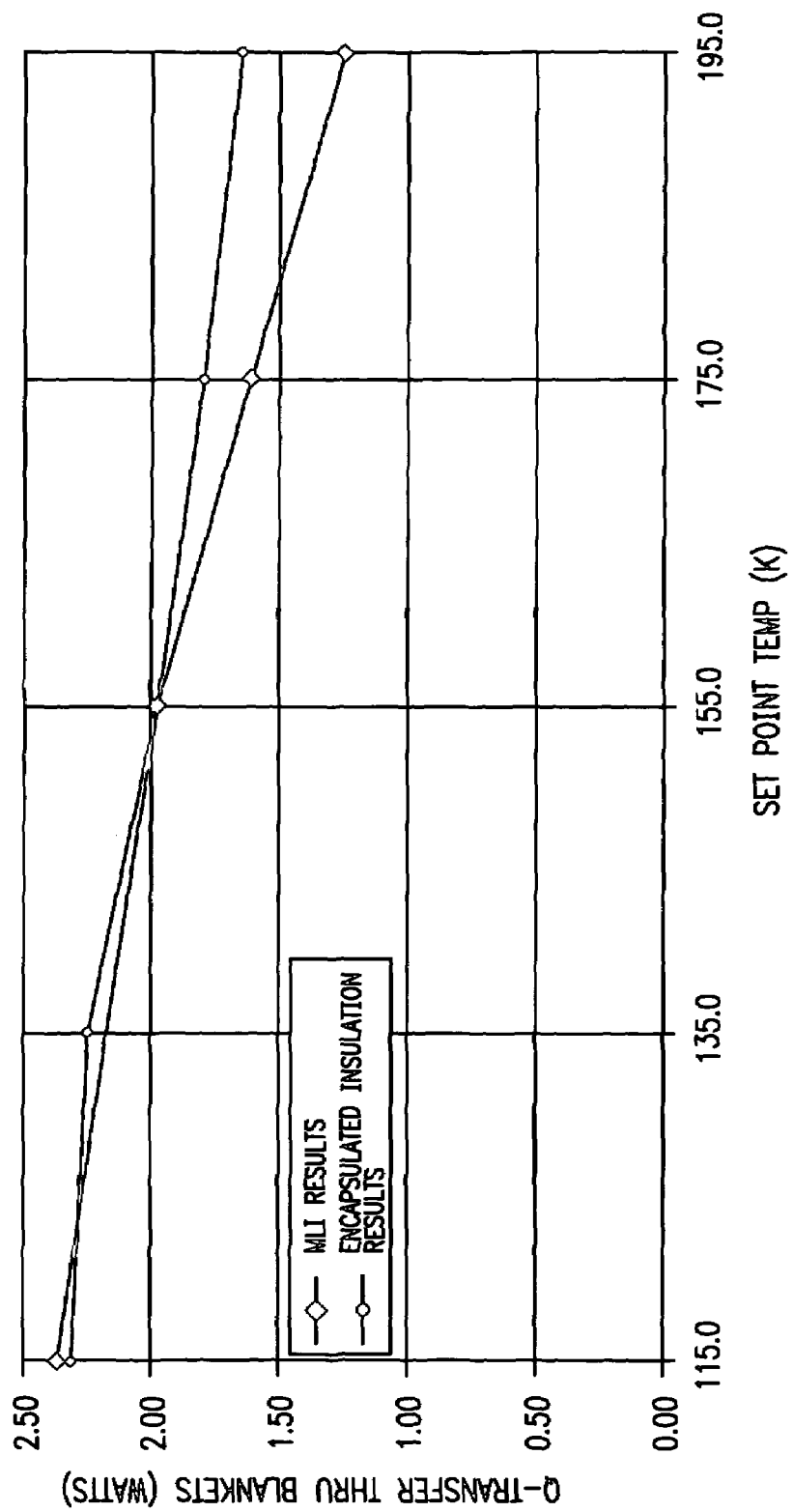
FIG. 8 is a graph of heat transfer through the insulation as a function of the test temperature.

The venting of the encapsulated and vented particulate thermal insulation was accomplished in about the same time as the pumpdown time for MLI insulation. The two types of insulation were designed to give about the same thermal performance. FIG. 8 depicts the nearly identical measured thermal performance of the two types of insulation as a function of the temperature that was being maintained, in one set of thermal conditions.

The encapsulated and vented particulate thermal insulation had several important advantages over the MLI insulation, for the case of approximately equivalent thermal performance. Careful records were maintained for the cost and labor required for the two insulation installations. The encapsulated and vented particulate thermal insulation required 48 percent less labor and was accomplished at 36 percent lower cost than for the MLI insulation. The weight of the encapsulated and vented particulate thermal insulation was 11 percent less than the weight of the MLI insulation. Reduced insulation weight in space hardware is an important consideration, in view of the high per-pound launch cost. When MLI insulation is damaged, as by accidentally dropping an insulated object or dropping something onto the insulated object, experience has shown that in nearly all cases the insulation is significantly compressed at the impact site so that a thermal short (i.e., a local high heat flow path) is formed. In the present comparison, an accidental dropping of the insulated telescope about 2-3 inches with the encapsulated and vented particulate thermal insulation in place did not cause similar damage and loss of insulating function. Consequently, the performance of the encapsulated and vented particulate thermal insulation is more predictable and more robust under ordinary handling conditions than that of the MLI insulation.

Thus, to summarize the performance, the encapsulated and vented particulate thermal insulation may be made to have substantially the same heat-flow performance as MLI insulation, but with lower cost, installation labor, weight, and susceptibility to damage, and better predictability and robustness.

Figure 9:
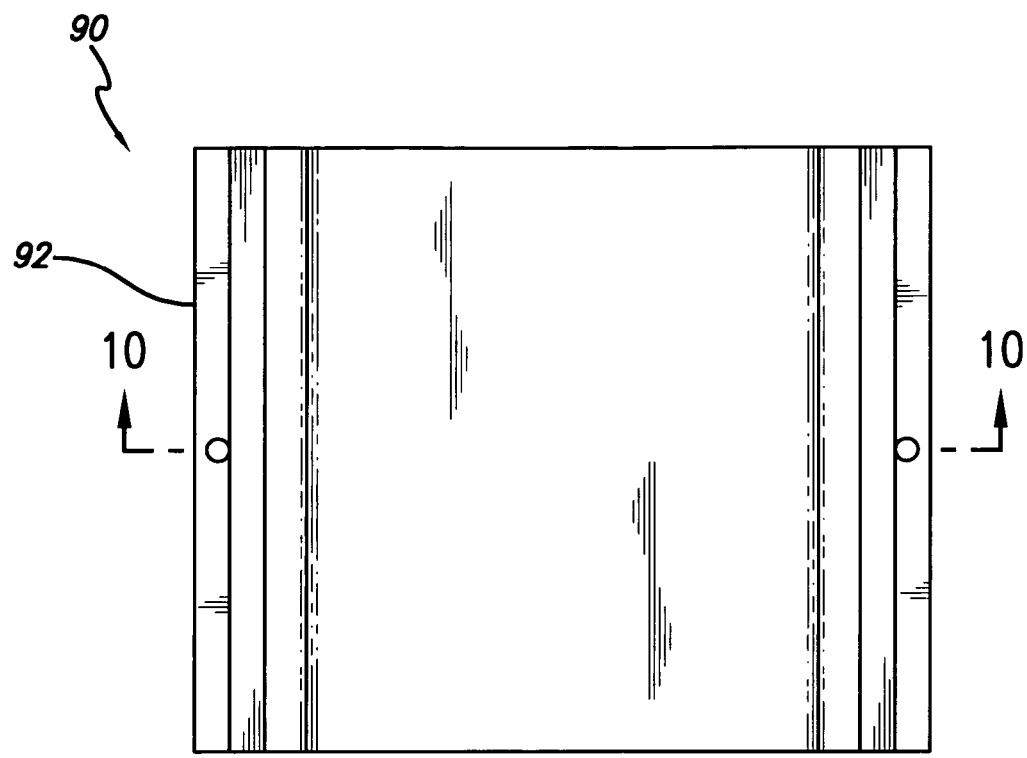
FIG. 9 is a plan view of encapsulated and vented particulate thermal insulation mounted to a frame.
Figure 10:
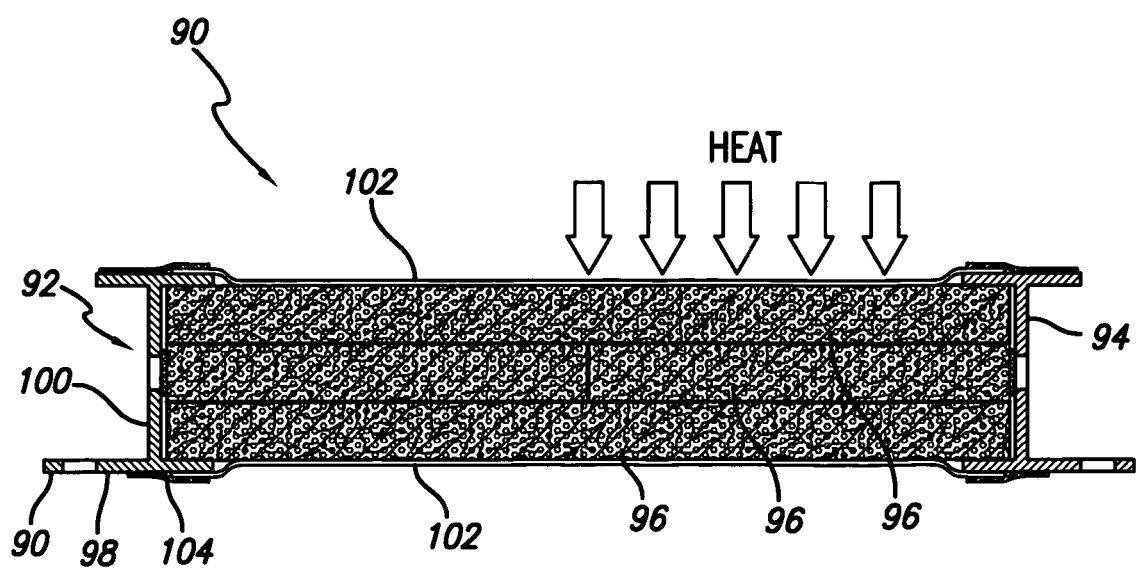
FIG. 10 is a sectional view of the encapsulated and vented particulate thermal insulation mounted to the frame of FIG. 9, taken on line 10-10.

In some applications, it is preferred that the encapsulated and vented particulate thermal insulation be provided in a rigidized-panel form. FIGS. 9-10 depict an insulating panel 90 in which the insulation is pieces of the encapsulated insulation 22 prepared as described previously. The panel 90 may be of any convenient size and shape when viewed in plan view. FIG. 9 depicts a preferred square panel 90. As seen in the sectional view of FIG. 10, a frame 92 of the panel 90 is formed of I-beams 94 (or other suitable structural form such as a C-channel) that are joined together at their ends to form the frame 92. The I-beams 94 are preferably made of a low-heat-conduction material such as G10 fiberglass. Pieces of the encapsulated insulation 22, here illustrated as three individual layers 96, are received in the space defined by the flanges 98 of the I-beams 94 that form the frame 92. The length of the web 100 of each I-beam 94 may be made as long as necessary to accommodate the desired number of layers 96 of the encapsulated insulation 22. The webs 100 of the I-beams 94 prevent the layers 96 from shifting laterally. Skin layers 102 of Mylar® polymer, either clear or aluminized, may optionally be provided. The surface layers 96 are affixed to the flanges 98 of the I-beams 94 by pieces of tape 104, such as a Kapton® tape. A number of these rigidized panels 90 may be assembled together to form an insulating structure that is self-supporting and free-standing, or may be attached in a panel-like fashion to a structure that is to be insulated.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article compatible for use in proximity to critical and/or sensitive components arranged in an environment, the article comprising:
   a piece of encapsulated insulation comprising
      an envelope having at least two vents therethrough;
      a particulate insulation within the envelope, wherein the insulation comprises a plurality of particles each having a size equal to or greater than a predetermined size;
      a porous filter overlying each vent of the envelope, wherein the porous filter has a mesh size sufficient to prevent passage of 0.5 micrometer particles through the porous filter so as to prevent the escape of any of the insulation particles from the envelope into the environment such that operation of the critical and/or sensitive components is not adversely affected; and
   wherein the particles are aerogel particles.

2. An article compatible for use in proximity to critical and/or sensitive components arranged in an environment, the article comprising:
   a piece of encapsulated insulation comprising
      an envelope having at least two vents therethrough;

a particulate insulation within the envelope, wherein the insulation comprises a plurality of particles each having a size equal to or greater than a predetermined size;

a porous filter overlying each vent of the envelope, wherein the porous filter has a mesh size sufficient to prevent passage of 0.5 micrometer particles through the porous filter so as to prevent the escape of any of the insulation particles from the envelope into the environment such that operation of the critical and/or sensitive components is not adversely affected; and wherein the particles are aerogel particles made of a material selected from the group consisting of inorganic, organic, or hybrid aerogel materials.

3. An article compatible for use in proximity to critical and/or sensitive components arranged in an environment, the article comprising:

a piece of encapsulated insulation comprising an envelope having at least two vents therethrough;

a particulate insulation within the envelope, wherein the insulation comprises a plurality of particles each having a size equal to or greater than a predetermined size;

a porous filter overlying each vent of the envelope, wherein the porous filter has a mesh size sufficient to prevent passage of 0.5 micrometer particles through the porous filter so as to prevent the escape of any of the insulation particles from the envelope into the environment such that operation of the critical and/or sensitive components is not adversely affected; and wherein the particulate insulation comprises a fiber-reinforced aerogel composite.

4. An article compatible for use in proximity to critical and/or sensitive components arranged in a space environment, the article comprising:

a piece of encapsulated insulation comprising an envelope having at least two vents therethrough, a continuous monolithic aerogel insulation within the envelope, and a porous filter overlying each vent of the envelope, wherein the porous filter has a mesh size no larger than a minimum particulate size that may be shed from the continuous aerogel insulation, wherein the mesh size of the porous filter prevents any aerogel particles from passing out of the envelope and into the space environment such that operation of the critical and/or sensitive components is not adversely affected.

* * * * *